(12) United States Patent
Jensen et al.

(10) Patent No.: US 6,868,071 B1
(45) Date of Patent: Mar. 15, 2005

(54) SYSTEM AND METHOD OF TRANSMITTING DATA FRAMES IN A MESH OF DATA SWITCHES

(75) Inventors: Kell Michael Jensen, Gentofte (DK); Christian J. Thrysoe, Soborg (DK); Frederik H. Andersen, Vaerloese (DK)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 09/714,382

(22) Filed: Nov. 15, 2000

(51) Int. Cl.[7] .............................................. H04L 12/28
(52) U.S. Cl. ...................... 370/256; 370/389; 370/360; 709/221; 709/230
(58) Field of Search ................................ 370/256, 401, 370/389, 360, 217, 219, 228, 254, 255, 390, 392, 396, 400, 408, 395.31, 252, 235, 455; 714/57; 709/221, 230, 220, 238, 239, 242, 243, 244, 252

(56) References Cited

U.S. PATENT DOCUMENTS

| | | | | |
|---|---|---|---|---|
| 5,323,394 A | * | 6/1994 | Perlman | 370/238 |
| 5,491,694 A | * | 2/1996 | Oliver et al. | 370/455 |
| 5,521,910 A | * | 5/1996 | Matthews | 370/256 |
| 5,774,662 A | * | 6/1998 | Sakagawa | 370/395.54 |
| 5,812,524 A | * | 9/1998 | Moran et al. | 370/228 |
| 5,872,783 A | * | 2/1999 | Chin | 370/395.32 |
| 6,084,858 A | * | 7/2000 | Matthews et al. | 370/238 |
| 6,122,759 A | * | 9/2000 | Ayanoglu et al. | 714/57 |
| 6,151,324 A | * | 11/2000 | Belser et al. | 370/397 |
| 6,172,981 B1 | * | 1/2001 | Cox et al. | 370/401 |
| 6,236,642 B1 | * | 5/2001 | Shaffer et al. | 370/237 |
| 6,330,229 B1 | * | 12/2001 | Jain et al. | 370/256 |
| 6,388,995 B1 | * | 5/2002 | Gai et al. | 370/256 |
| 6,456,597 B1 | * | 9/2002 | Bare | 370/252 |
| 6,535,491 B2 | * | 3/2003 | Gai et al. | 370/256 |
| 6,556,541 B1 | * | 4/2003 | Bare | 370/235 |
| 6,556,574 B1 | * | 4/2003 | Pearce et al. | 370/401 |
| 6,597,656 B1 | * | 7/2003 | Blanc et al. | 370/219 |
| 6,621,798 B1 | * | 9/2003 | Krishnan et al. | 370/256 |
| 6,711,171 B1 | * | 3/2004 | Dobbins et al. | 370/400 |

OTHER PUBLICATIONS

Office Action for pending U.S. Appl. No. 09/714,383 mailed Jan. 12, 2004.
After Final Action for pending U.S. Appl. No. 09/714,383, mailed Apr. 29, 2004.
Hewlett Packard, LAN Aggregation Through Switch Meshing, Technical Brief, pp. 1–11.

* cited by examiner

*Primary Examiner*—John Pezzlo
(74) *Attorney, Agent, or Firm*—Robert A. Greenberg (57) ABSTRACT

A system and method of transmitting data frames between media access control (MAC) devices through a mesh of data switches is disclosed. Each of the data switches maps each MAC device to a port or aggregation of ports on the data switch for transmitting data frames having a destination associated with the MAC device. Upon receipt of a data frame from a previously undiscovered MAC device at a first data switch, the first data switch informs the other data switches of the undiscovered MAC device. This permits each of the other data switches to map the undiscovered MAC device with a port or aggregation of ports mapped to the first data switch. The other data switches may then transmit subsequent data frames having a destination associated with the previously undiscovered MAC device through a port or aggregation of ports mapped to the first data switch.

15 Claims, 4 Drawing Sheets

SYSTEM AND METHOD OF TRANSMITTING DATA FRAMES IN A MESH OF DATA SWITCHES

The information disclosed herein relates to co-pending U.S. patent application Ser. No. 09/714,383 filed Nov. 15, 2000.

BACKGROUND

1. Field

Embodiments disclosed herein relate to data networks. In particular, embodiments disclosed herein relate to systems and methods of transmitting data frames to and from devices coupled in a data network.

2. Background Information

Media access control (MAC) devices typically transmit data frames according to established network communication protocols such as the Ethernet protocol. For example, a source MAC device may transmit a data frame to a destination MAC device through a data network. The data frame typically includes a header portion and a data payload portion. The header portion may have a field for a network address of a source MAC device and a field for a network address of a destination MAC device. The data payload portion may include a part of a larger data item to be received at the destination MAC. A process may transmit several data frames through a source MAC device to the destination MAC device as part of a large data item which cannot be transmitted in the data payload of a single data frame.

The network coupling the source and destination MAC devices typically includes one or more data switches for routing data traffic among several MAC devices. Each of the data switches typically includes several ports for coupling directly to either another data switch or a MAC device. The data switches may be coupled together such that data frames transmitted from a source MAC device to a destination MAC device may be routed through two or more data switches before being received at the destination MAC device. Such a network of data switches may couple ports together to provide a spanning tree protocol in which one switch is coupled to a switch external to the mesh and all other switches are coupled to the central switch in a hierarchical tree structure.

While the spanning tree structure provides an effective system for transmitting data traffic between MAC devices coupled to the network and nodes outside of the network, the spanning tree structure does not make efficient use of the data switches in the network for transmitting data frames between MAC devices in the network. Therefore, there is a need to provide systems and methods which more efficiently use data switches in transmitting data between MAC devices in a data network.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "MAC device" as referred to herein relates to devices adapted to receive data transmitted on a medium. Such a MAC device may receive data in the format of data frames. However, embodiments of the present invention are not limited in this respect.

A "data switch" as referred to herein relates to a system for transmitting data from a source to a destination. In one embodiment, a data switch includes one or more "ports" coupled to a transmission medium for receiving data from sources and transmitting data to destinations. A data switch may comprise an "aggregation" of ports capable of transmitting data to a particular destination. However, embodiments of the present invention are not limited in this respect.

According to an embodiment, a plurality of data switches may be coupled together at their respective ports to form a "mesh" of data switches. A "source data switch" in the mesh may transmit data to a "destination data switch" in the mesh. According to an embodiment, a MAC device may be coupled to a port of a source data switch to transmit data through a mesh to a destination data switch. However, embodiments of the present invention are not limited in this respect. In another embodiment, data may be transmitted to a "destination MAC device" through a destination data switch coupled to a port of a destination data switch. However, embodiments of the present invention are not limited in this respect.

In one embodiment of a mesh of data switches, data may be transmitted from a source data switch to a destination data switch through one or more "destination data switches." However, embodiments of the present invention are not limited in this respect. Data may be transmitted from a source data switch to a destination data switch through a "data path" in a mesh of data switches including, for example, transmission links coupling the source data switch to the destination data switch. Such a data path may also include one or more data switches. However, embodiments of the present invention are not limited in this respect.

Embodiments of the present invention are directed to a system and method of transmitting data frames between media access control (MAC) devices through a mesh of data switches. Each of the data switches maps each MAC device to a port or aggregation of ports on the data switch for transmitting data frames having a destination associated with the MAC device. Upon receipt of a data frame from a previously undiscovered MAC device at a first data switch, the first data switch informs the other data switches of the undiscovered MAC device. This permits each of the other data switches to map the undiscovered MAC device with a port or aggregation of ports mapped to the first data switch. The other data switches may then transmit subsequent data frames having a destination associated with the previously unmapped MAC device through a port or aggregation of ports mapped to the first data switch.

Figure 1:
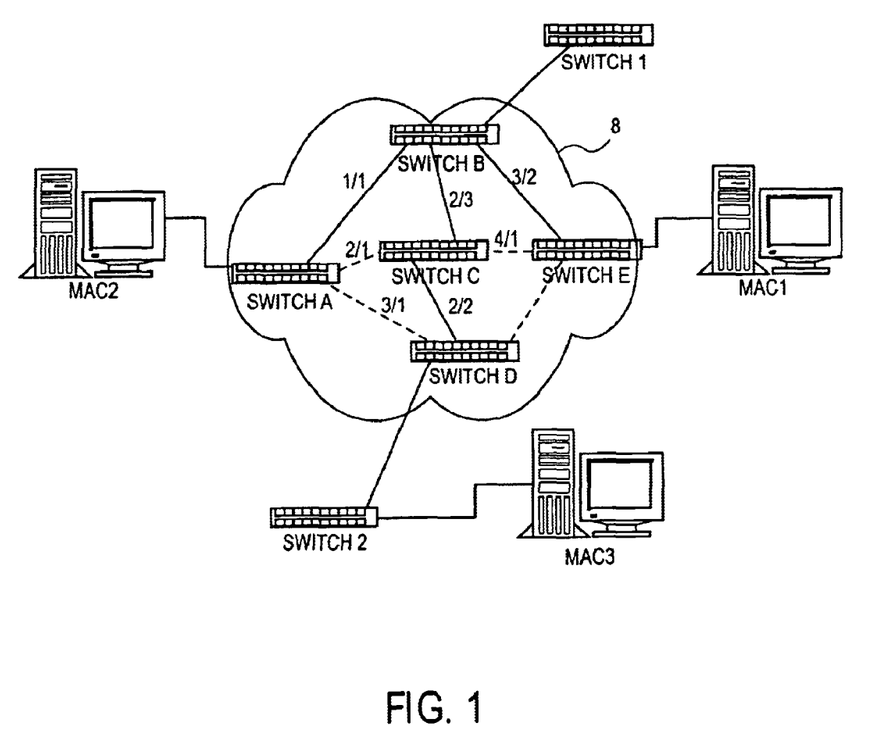
FIG. 1 shows a network topology including media access control (MAC) devices coupled to a mesh of data switches according to an embodiment of the present invention.

FIG. 1 shows a schematic diagram of a network topology including MAC devices coupled to a mesh of data switches 8. In the illustrated embodiment, data frames may be transmitted among MAC devices MAC1, MAC2 and MAC3 through the mesh of data switches 8 according to a frame transmission protocol such as Ethernet or other communication protocols for transmitting data frames between MAC devices. However, embodiments of the present invention are not limited in this respect. Each of the data switches Switch A through Switch E include a plurality of numbered ports for coupling to either a MAC device or another data switch in the network through a transmission link. The transmission links shown may be of any one of several transmission mediums including, for example, category five cable or fiber optic cable. MAC devices MAC1 and MAC2 are directly coupled to data switches Switch E and Switch A, respectively.

According to an embodiment, the MAC devices transmit data through the mesh 8 in the form of ordered data frames which are reassembled at a destination. Each data frame may include a header with a "source address" (identifying the MAC device generating the data frame) and a "destifation address" (identifying a destination MAC device). However, embodiments of the present invention are not limited in this respect and information identifying the source or destination of a data frame may be provided in other parts of the data frame. The data frame may also include information indicating an order in which the data payload of the data frame is to be placed in a data item reassembled at the destination. However, embodiments of the present invention are not limited in this respect.

In the illustrated embodiment, the data switches shown in FIG. 1 include a plurality of transmission ports and a central controller or processor (hereinafter referred to as a "data switch controller"). Each port may be coupled to transmit data to or receive data from a MAC device or another switch through a transmission link. The data switch also includes circuitry such as a switching fabric for transmitting data frames from receiving ports to transmitting ports. The data switch controller may perform tasks such as selecting a port on the data switch for transmitting a received data frame based upon the destination address of the data frame.

The data switches in the mesh 8 may be configured for transmission according to a "spanning tree" protocol in which Switch B is the highest data switch in a hierarchy defining a spanning tree topology. FIG. 1 illustrates links in the spanning tree topology as solid lines. According to this protocol, frames transmitted between any two MAC devices MAC1, MAC2 or MAC3 pass through Switch B. For example, data frames transmitted from MAC2 to MAC3 travel a data path including Switch A, Switch B, Switch C, Switch D and Switch 2. However, this is merely an example of an implementation of a spanning tree protocol and embodiments of the present invention are not limited in this respect.

In an alternative protocol, link aggregation may provide a more direct data path such that the same data transmission from MAC2 and MAC3 need only pass through Switch A, Switch D and Switch 2, bypassing Switch B and Switch D in the spanning tree topology. In the alternative protocol described below, data may be transmitted through links shown as broken lines in FIG. 1 in addition to the links in the spanning tree topology. Transmission in the alternative protocol may reduce the transmission latency of data frames transmitted between the MAC devices MAC2 and MAC3.

Figure 2:
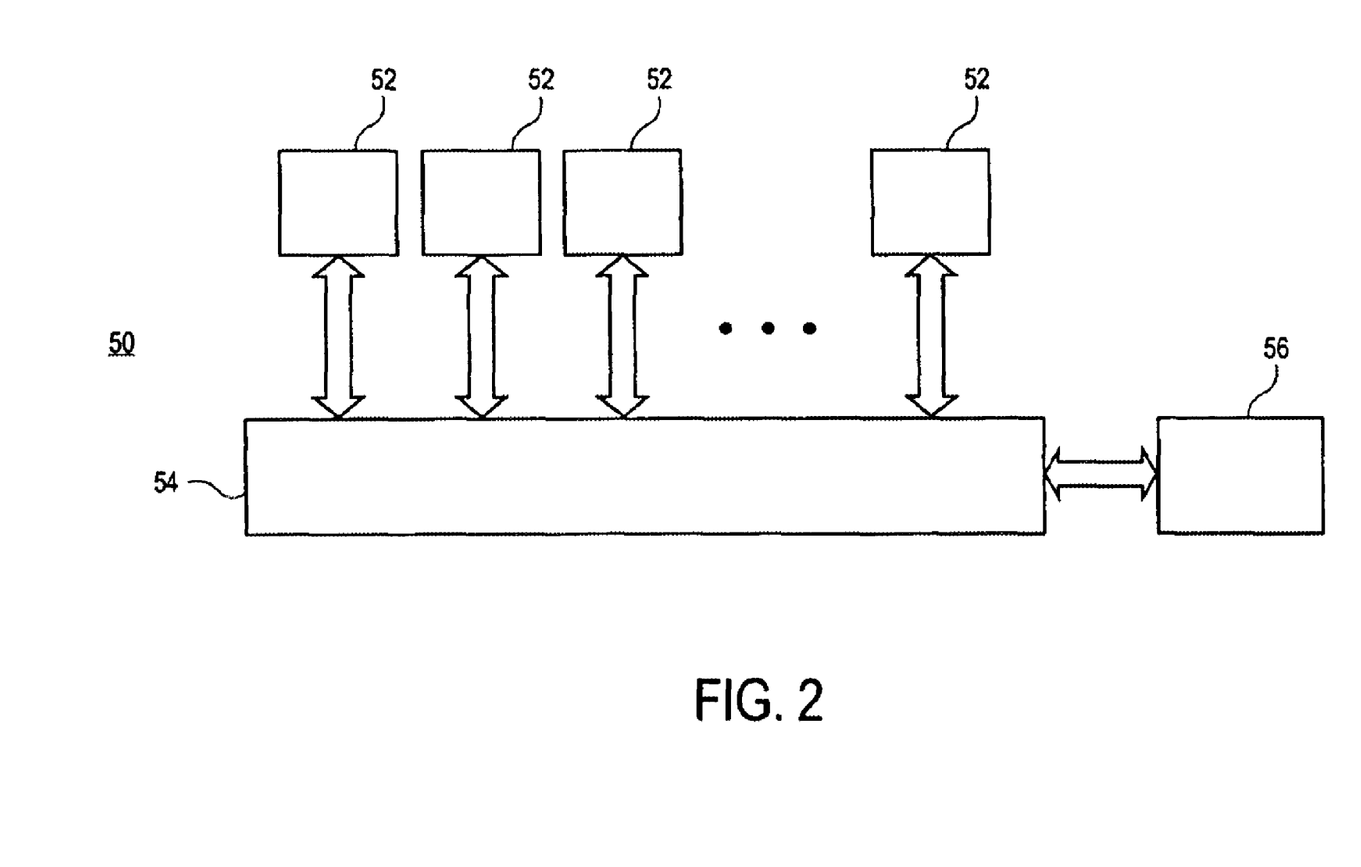
FIG. 2 shows a schematic diagram of an architecture for a data switch according to an embodiment of the present invention.

FIG. 2 shows a schematic diagram of an architecture for a data switch according to an embodiment. Such a data switch may be employed as a data switch in mesh 8. However, embodiments of the present invention are not limited in this respect. The architecture comprises a switching fabric including a plurality of number ports 52 coupled to a programmable crossbar 54. The switching fabric is coupled to a data switch controller 56 to provide programming signals to the crossbar 54. Each of the ports 52 may be formed in an individual application specific integrated circuit (ASIC). The crossbar 54 and the controller 56 may be formed in separate ASIC components coupled by a bus. In another embodiment, the crossbar 54 and controller 56 may be formed in the same ASIC. Alternatively, the controller 56 may be a microprocessor controlled by instructions stored in a memory while the crossbar 54 is an ASIC. However, these are merely examples of architectures for a data switch and embodiments of the present invention are not limited in this respect.

In response to programming signals from the controller 56, the crossbar 54 may be configured to transmit a received data frame through a selected transmitting port 52. The transmitting port may be selected based upon information in the received data frame. For example, the controller 56 may program the crossbar 54 to transmit all received data frames having a particular destination address through a particular port 52 coupled to a particular MAC device (corresponding with the destination address) through the mesh 8. As discussed below, the controller 56 may program the crossbar 54 to select a transmitting port 52 for forwarding a received data frame based upon criteria in addition to the destination address of the received data frame.

FIG. 1 shows that three of the numbered ports of each of the data switches in the mesh 8 are coupled to three other data switches in the mesh. Table 1 below illustrates a representative mapping of ports used in each data switch for coupling to another data switch in the mesh 8. However, data switches in a mesh of data switches may be coupled in different topologies and embodiments of the present invention are not limited in this respect.

TABLE 1

| Connected Switch Pairs in Mesh | Ports on Data Switch Providing Link Between Switch Pair | | | | |
|---|---|---|---|---|---|
| | Switch A | Switch B | Switch C | Switch D | Switch E |
| Switch A & Switch B | 1 | 1 | | | |
| Switch A & Switch C | 2 | | 1 | | |
| Switch A & Switch D | 3 | | | 1 | |
| Switch B & Switch C | | 2 | 3 | | |
| Switch B & Switch E | | 3 | | | 2 |
| Switch C & Switch D | | | 2 | 2 | |
| Switch C & Switch E | | | 4 | | 1 |

According to an embodiment, each data switch in the mesh of data switches 8 may implement link aggregation in the process of selecting a port on which to transmit a received data frame toward a destination. Each MAC device is directly coupled to an associated data switch such that data frames transmitted to or received from the mesh 8 is transmitted through the associated data switch. The data switch controller at a data switch maintains a mapping of each discovered MAC device (in the network) with its associated destination data switch. In selecting a port to transmit a received data frame to a destination, the data switch controller may determine a destination MAC device of the data frame from the destination address in the data frame header, associate the destination MAC device with its destination data switch, and select a port for transmitting the frame based upon the destination data switch.

The data switch controller of a source data switch in the mesh 8 associates in a data structure each of the other data switches in the network with a port or aggregation of ports. In transmitting a received data frame to a destination MAC device (and therefore to a corresponding destination data switch), the source data switch transmits the received data frame through the port or aggregation of ports associated with the corresponding destination data switch.

As illustrated in FIG. 1, for example, Switch A as a source data switch may receive a data frame from MAC device MAC2 having a destination of either MAC1 or MAC3. If the destination is MAC3, the corresponding destination data switch will be Switch D. Since Switch A is directly coupled to Switch D, the data switch controller of Switch A maps the Switch D to the single port 3 of Switch A. If the destination is MAC1, the corresponding destination data switch will be Switch E. Since Switch A is coupled to Switch E indirectly through Switch B, Switch C and Switch D, the data switch controller of Switch A maps the Switch E to the aggregation of port 1 (coupled directly to Switch B), port 2 (coupled directly to Switch C) and port 3 (coupled directly to Switch D). However, this is merely an example of how data may be transmitted from a source data switch to a destination data switch and embodiments of the present invention are not limited in this respect.

Table 2 below illustrates how the data switch controller of each of the data switches in the mesh 8 acting as a source data switch may maintain a data structure to map each potential destination data switch to a port or aggregation of ports of the source data switch. However, potential ports or aggregation of ports may be mapped to destination data switches using other techniques and embodiments of the present invention are not limited in this respect.

TABLE 2

| SOURCE SWITCH | DESTINATION SWITCH | PATH FROM SOURCE SWITCH |
| --- | --- | --- |
| A | B | Port 1 |
| A | C | Port 2 |
| A | D | Port 3 |
| A | E | Link Aggregation of Ports 1, 2 and 3 |
| B | A | Port 1 |
| B | C | Port 2 |
| B | D | Link Aggregation of Ports 1, 2 and 3 |
| B | E | Port 3 |
| C | A | Port 1 |
| C | B | Port 3 |
| C | D | Port 2 |
| C | E | Port 4 |
| D | A | Port 1 |
| D | B | Link Aggregation of Ports 1, 2 and 3 |
| D | C | Port 2 |
| D | E | Port 3 |

TABLE 2-continued

| SOURCE SWITCH | DESTINATION SWITCH | PATH FROM SOURCE SWITCH |
| --- | --- | --- |
| E | A | Link Aggregation of Ports 1, 2 and 3 |
| E | B | Port 2 |
| E | C | Port 1 |
| E | D | Port 3 |

The data switch controller may determine an allocation of transmitting ports for forwarding each received data frame according to criteria such as the destination address of the received data frame. In the switching fabric of FIG. 2, the controller 56 may determine a rule based allocation and program the crossbar 54 to forward received data frames to transmitting ports according to the rule based allocation. For data frames having a destination address corresponding with only a single port (i.e., the associated destination data switch does not corresponding with an aggregation of ports as illustrated in Table 2), the data switch controller may allocate the single port for the transmission of all such data frames. For data frames having a destination address associated with an aggregation of ports, the data switch controller may define additional criteria for selecting a transmitting port from among an aggregation of ports for forwarding data frames to the destination data switch corresponding with the destination address.

Figure 3:
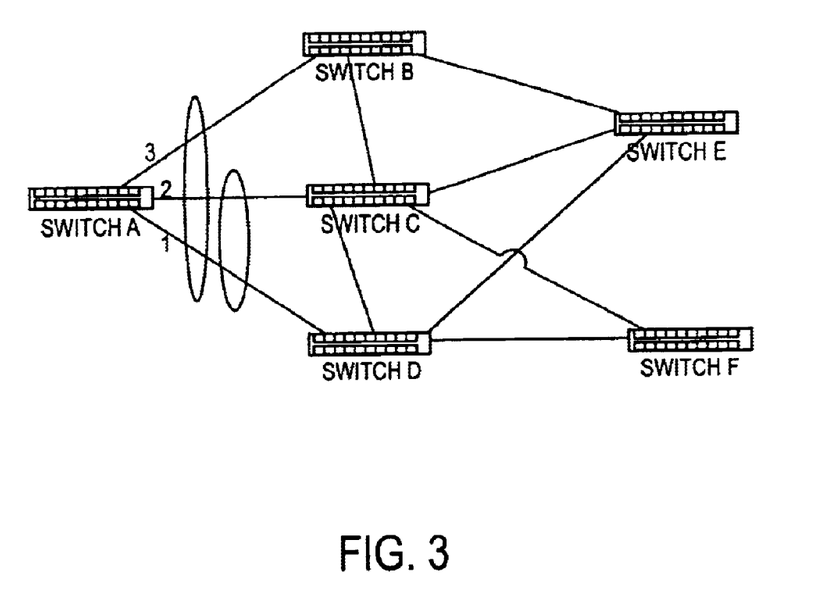
FIG. 3 shows a network topology in which a data switch defines overlapping link aggregation groups according to an embodiment of the present invention.

An example of determining a rule based allocation of ports within an aggregation of ports is illustrated with reference to FIG. 3. FIG. 3 shows a topology of the mesh 8 of FIG. 1 with an additional data switch Switch F. As illustrated in Table 1, the data switch controller of Switch A maps an aggregation of ports to destinations at Switch E including port 1, port 2 and port 3. FIG. 3 shows that the data switch controller of Switch A may also map an aggregation of ports to Switch F including port 1 and port 2. According to an embodiment, the data switch controller may allocate ports in an aggregation of ports so as to avoid the incidence of overlapping port aggregations. However, the allocation of ports in an aggregation of ports may be performed according to other criteria and embodiments of the present invention are not limited in this respect.

For example, if a port aggregation of a first destination data switch maps completely onto a port aggregation of a second destination data switch, the data switch controller may map all of the overlapping ports for the transmission of data frames to the first destination data switch while assigning (or mapping) all of the non-overlapping ports for the transmission of data frames to the second destination data switch. The data switch controller may then use other criteria for determining how multiple ports allocated to a destination data switch are to be allocated to each data frame having an address associated with the destination data switch. However, embodiments are not limited in this respect. The criteria for selecting one of the multiple ports for transmitting the data frame may be based upon the other information in the data frame such as the particular destination MAC device as reflected in the destination address or particular source MAC device as reflected in the source address. On the other hand, embodiments of the present invention are not limited in this respect and selection of a transmitting port from among a plurality of ports may be based upon other information independent of the content of the data frame.

As illustrated in the example shown in FIG. 3, the data switch controller of Switch A may initially assign an aggregation of port 1, port 2 and port 3 to destination Switch E and assign an aggregation of port 1 and port 2 to destination Switch F. Switch A may maintain the assignment of the aggregation of port 1 and port 2 to Switch F and assign only port 3 to Switch E. For each data frame having a destination address associated with destination Switch A, the data switch controller may define additional criteria for selecting either port 1 or port 2 for transmitting the data frame based upon other information in the data frame. Such additional criteria may be based upon information such as a particular destination MAC device as reflected in the destination address or a particular source MAC device as reflected in the source address. However, such additional criteria may be based upon other information and embodiments of the present invention are not limited in this respect.

In another example, a source data switch may assign an aggregation of port 1 and port 2 to a first destination data switch, and assign an aggregation of port 2 and port 3 to a second destination data switch. The data switch controller may map to each of the destination data switches a port which is unique to the aggregation of ports assigned to the destination data switch. In the illustrated example, port 1 may be selected for the transmission of all data frames having a destination address associated with the first destination data switch and port 2 may be selected for the transmission of all data frames having a destination address associated with the second data switch. Again, embodiments of the present invention are not limited in this respect.

In the embodiment illustrated with reference to FIG. 2, the controller 56 may program the crossbar 54 to apply decision logic for the selection of a transmitting port for forwarding a received data frame based upon rules defined at the controller 56. The controller 56 may maintain a data structure for associating each of the destination data switches with a port or aggregation of ports as illustrated in Table 2. Additionally, such a data structure may associate a network address of each MAC device known to be coupled to the mesh 8. Thus, the controller 56 may establish static decision logic to select a transmission port based upon the information in the data structure. Based upon the destination address of a received data frame, the decision logic as programmed in the crossbar 54 may initially identify a single port or aggregation of ports providing a data path to an associated destination data switch. If a single port is identified, the decision logic may select the single port for transmitting the data frame to the destination data switch. If an aggregation of ports is identified, as illustrated above the decision logic may select a port from among the aggregation of ports for transmitting the data frame to the destination data switch.

Figure 4:
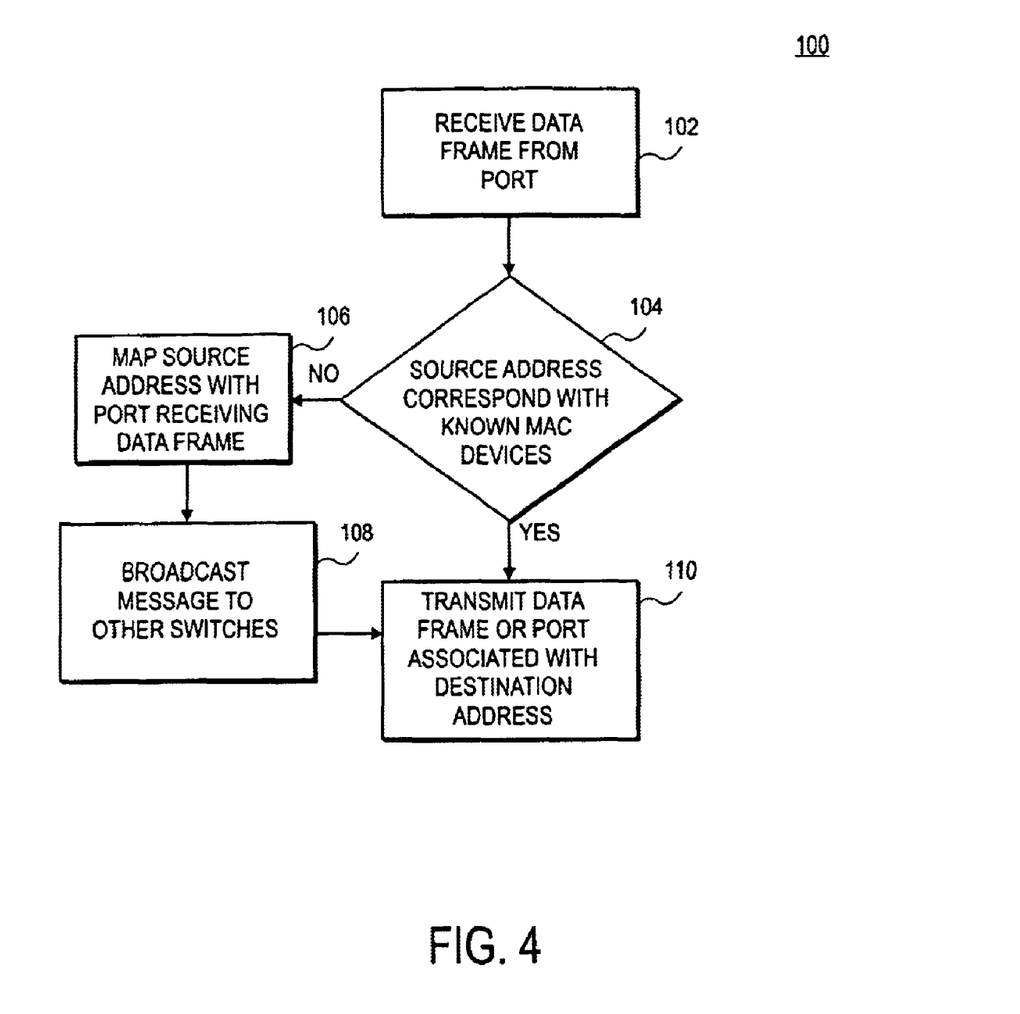
FIG. 4 shows a flow diagram illustrating logic executed at a data switch upon receipt of a data frame originating at an unknown or unmapped MAC device according to an embodiment of the present invention.

According to an embodiment, undiscovered MAC devices may be detected on the network at a single data switch and incorporated into the above described link aggregation system and method. FIG. 4 shows a flow diagram illustrating logic executed at a data switch controller of a receiving data switch for incorporating undiscovered MAC devices. A data frame transmitted by an undiscovered MAC device is received at block 102. Block 104 evaluates the source address in the header of the received frame and attempts to match the source address with the network address of a known MAC device (i.e., a MAC device incorporated into the network of data switches in mesh 8). If the source address matches a network address of a known MAC device, block 110 may initiate the transmission of the data frame on a port associated with the destination address in the header.

If block 104 determines that the received data frame did not originate from a known MAC device, block 106 may map the source address of the data frame header with the port receiving the data frame at block 102 in the data structure. When the receiving data switch receives data frames addressed to the newly discovered source MAC device in the future, the receiving data switch may transmit the data frames to the MAC device on the port receiving the data frame at block 102 as discussed above.

Block 108 initiates a broadcast message from the receiving data switch to the data switch controllers of the other data switches in the mesh 8 indicating that the discovered MAC device was detected at the receiving data switch. In one embodiment, the broadcast message may be transmitted to the other data switches through the data links according to an out of band protocol. Alternatively, the broadcast message is transmitted according to a communication protocol through separate data bus (not shown) coupled to the data switch controllers of the data switches in the mesh. Upon receipt of the broadcast message, the other data switches may associate the network address of the discovered MAC device with a port or aggregation of ports mapped to the receiving data switch. Accordingly, the other data switches can forward all future data frames addressed to the discovered MAC device by transmitting the data frames through the port or aggregation of ports assigned to the receiving data switch as the destination data switch.

A data switch may receive data frames having a destination address corresponding with a MAC device which is not incorporated into the data switches of the mesh 8 (i.e., no data switch in the mesh 8 is mapped as a destination data switch for the MAC device). Such a condition may occur, for instance, if a MAC device transmits a data frame to a discovered MAC device detected at block 104 before the other data switches can map the discovered MAC device to a destination data switch upon receipt of the broadcast message. According to an embodiment, a data switch receiving the data frame addressed to the unincorporated MAC device may transmit the data frame to the destination MAC device according to the spanning tree protocol as outlined above. Upon receipt of a broadcast message associating a destination data switch with the unincorporated MAC device, the source data switch may commence transmitting received data frames to the destination MAC device through a port (or a selected one of an aggregation of ports) mapped to the destination data switch associated with the destination MAC device.

When transitioning from the slower protocol to a faster protocol (such as the aforementioned link aggregation protocol) in real-time, data frames may arrive out of order at the destination MAC device. That is, the later data frames transmitted in the faster protocol may arrive at the destination MAC device before the earlier data frames transmitted in the slower protocol. If the earlier and later data frames are part of the same multi-frame data item, the destination MAC device may allocate processing resources to re-order the received data frames to reconstruct the transmitted data item.

To reduce the incidence of data frames arriving at a destination MAC device out of order as a consequence of transitioning from the a slower protocol to a faster protocol, the data switch may suspend such a transition to the faster protocol to ensure a delay from the transmission of the last data frame transmitted according to the slower tree protocol and the transmission of a first data frame according to the faster protocol. Ensuring a set delay between the transmission of the last data frame on the slower protocol and the first data frame on the faster protocol may reduce the probability of data frames arriving at a destination MAC device out of order. In one embodiment, the set delay may be a fixed duration for all transitions from the slower protocol to any of the faster protocols to any of the destination data switches. Alternatively, the source data switch may calculate the set delay duration based upon the difference between the expected transmission times to the destination MAC device using the slower protocol and using the faster protocol.

According to an embodiment, a source data switch may suspend the transition to the faster protocol by resetting a counter upon transmitting each data frame according to the slower protocol. If the source data switch receives a subsequent data frame for transmission to the destination MAC device before the counter expires, the source data switch transmits the data frame according to the slower protocol and resets the counter. If the source data switch receives the subsequent data frame for transmission after the counter expires, the source data switch can ensure the aforementioned set delay between the transmission times for the last data frame according to the slower protocol and the first data frame according to the faster protocol.

In an alternative embodiment, the source data switch may ensure the delay between the transmission times for the last data frame according to the slower protocol and the first data frame according to the faster protocol by buffering received data frames addressed to the destination MAC device to force the delay. In this transition, the transmission of any buffered data frame is suspended following the transmission of the last data frame according to the slower protocol for the set delay duration.

The above described exemplary embodiments are directed to transitions from the use of a spanning tree protocol to a more direct transmission protocol employing link aggregation techniques. However, embodiments of the present invention may also be applied to the use of other techniques for transmitting data frames to a destination where a second data path or protocol may be detected for use in lieu of a slower data path or protocol presently being used for transmitting data frames to the destination. Upon detection of the faster protocol or data path, embodiments of the present invention may be implemented to ensure a delay between transmission of the last data frame in the slower protocol or data path and transmission of the first data frame in the faster protocol or data path.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of transmitting data through a mesh of data switches, the method comprising:
   receiving a data frame at a first port of a receiving data switch, the data frame originating at a first MAC device and having a destination address associated with a second MAC device, the second MAC device being associated with a destination data switch in the mesh;
   maintaining a data structure associating each of a plurality of destination addresses of discovered MAC devices with one of a port and an aggregation of ports on the receiving data switch;
   comparing the destination address of the received data frame with the data structure to determine a match with an associated one of a port and aggregation of ports;
   transmitting the received data frame through the mesh of data switches according to a spanning tree protocol if no match is determined;
   receiving a message at the receiving data switch specifying the destination data switch associated with the destination address of the second MAC device;
   associating in the data structure the destination address of the second MAC device with a transmitting port on the receiving data switch; and
   suspending a transition for transmission of subsequent data frames to the second MAC device through a data path including the transmitting port to ensure a delay from a transmission of a last data frame according to the spanning tree protocol to a transmission of a first data frame according to a different protocol through the data path.

2. The method of claim 1, the method further comprising selecting the associated one of the port and aggregation of ports for transmitting the received data frame to the destination data switch if the match is determined.

3. The method of claim 2, the method further comprising selecting one port in the aggregation of ports for transmitting the data frame based upon one of the destination address and a source address of the received data frame.

4. A source data switch for transmitting data frames through a mesh of data switches, the source data switch comprising:
   a switching fabric including a plurality of ports;
   logic to maintain a data structure associating each of a plurality of destination addresses of discovered MAC devices coupled to the mesh of data switches with one of a port and an aggregation of ports of the switching fabric, each port in the aggregation of ports coupling to a data path through the mesh of switches to a MAC device having one of said plurality of destination addresses;
   logic to compare the destination address of a received data frame with the data structure to determine a match with one of a port and an aggregation of ports;
   logic to transmit the received data frame through the mesh of data switches according to a spanning tree protocol if no match is determined;
   logic to receive a message specifying a destination data switch associated with the destination address of the received data frame;
   logic to associate in the data structure the destination address of the received data frame with a transmitting port of the switching fabric based upon the destination data switch; and
   logic to suspend a transition for transmission of subsequent data frames to the destination address of the received data frame through a data path including the transmitting port to ensure a delay from a transmission of a last data frame according to the spanning tree protocol to a transmission of a first data according to a different protocol frame through the data path.

5. The source data switch of claim 4, the source data switch further comprising
   logic to select the associated one of the port and aggregation of ports for transmitting the received data frame to the destination data switch if a match is determined.

6. The source data switch of claim 5, the source data switch further comprising logic to select one port in the aggregation of ports for transmission of the received data frame based upon one of the destination address and a source address of the received data frame.

7. A data switch controller comprising:
an interface adapted for coupling to a switching fabric, the switching fabric including a plurality of ports;
logic to maintain a data structure associating each of a plurality of destination addresses of discovered MAC devices coupled to a mesh of data switches with one of a port and an aggregation of ports of the switching fabric, each port in the aggregation of ports coupling to a data path through the mesh of switches to a MAC device having the destination address;
logic to compare the destination address a received data frame with the data structure to determine a match with an associated one of a port and aggregation of ports;
logic to transmit the received data frame through the mesh of data switches according to a spanning tree protocol if no match is determined;
logic to receive a message specifying a destination data switch associated with the destination address of the received data frame;
logic to associate in the data structure the destination address of the received data frame with a transmitting port of the switching fabric based upon the destination data switch; and
logic to suspend a transition for transmission of subsequent data frames to the destination address of the received data frame through a data path including the transmitting port to ensure a delay from a transmission of a last data frame according to the spanning tree protocol to a transmission of a first data frame according to a different protocol through the data path.

8. The data switch controller of claim 7, the data switch controller further comprising
logic to select the associated one of the port and aggregation of ports for transmission of the received data frame to the destination data switch if the match is determined.

9. The data switch controller of claim 8, the data switch controller further comprising logic to select one port in the aggregation of ports for transmission of the received data frame based upon one of the destination address and a source address of the received data frame.

10. A data network for transmitting data frames from a source MAC device to a destination MAC device, the data network comprising:
a destination data switch coupled to the destination MAC device;
a mesh of data switches coupled to the destination data switch for transmitting data frames originating at the source MAC device to the destination MAC device; and
a source data switch coupled to the source MAC device including:
a switching fabric including a plurality of ports;
logic to maintain a data structure associating each of a plurality of destination addresses of discovered MAC devices coupled to the mesh of data switches with one of a port and an aggregation of ports of the switching fabric, each port in the aggregation of ports coupling to a data path through the mesh of switches to a MAC device having the destination address;
logic to compare the destination address of the received data frame with the data structure to determine a match with an associated one of the port and aggregation of ports;
logic to transmit the received data frame through the mesh of data switches according to a spanning tree protocol if no match is determined;
logic to receive a message specifying a destination data switch associated with the destination address of the received data frame;
logic to associate in the data structure the destination address of the received data frame with a transmitting port of the switching fabric based upon the destination data switch; and
logic to suspend a transition for transmission of subsequent data frames to the destination address through a data path including the transmitting port to ensure a delay from a transmission of a last data frame according to the spanning tree protocol to a transmission of a first data frame according to a different protocol through the data path.

11. The data network of claim 10, wherein the source data switch further comprises;
logic to select the associated one of the port and aggregation of ports for transmission of the received data frame to the destination data switch if a match is determined.

12. The data network of claim 11, wherein the source data switch further comprises logic to select one port in the aggregation of ports for transmission of the received data frame based upon one of the destination address and a source address of the received data frame.

13. An article comprising:
a storage medium comprising machine-readable instructions stored thereon for:
maintaining a data structure associating each of a plurality of destination addresses of discovered MAC devices with one of a port and an aggregation of ports of a receiving data switch;
detecting receipt of a data frame at a first port of a switching fabric, the switching fabric having a plurality of ports, the data frame having a destination address associated with a destination MAC device coupled to the switching fabric through a mesh of data switches at a destination data switch;
comparing the destination address of the received data frame with the data structure to determine a match with an associated one of the port and aggregation of ports;
transmitting the received data frame through the mesh of data switches according to a spanning tree protocol if no match is determined;
receiving a message specifying a destination data switch associated with the destination address of the received data frame;
associating in the data structure the destination address of the received data frame with a transmitting port of the switching fabric based upon the destination data switch; and
suspending a transition for transmission of subseguent data frames to the destination address of the received data frame through a data path including the transmitting port to ensure a delay from a transmission of a last data frame according to the spanning tree protocol to a transmission of a first data frame according to a different protocol through the data path.

14. The article of claim 13, wherein the storage medium further comprises machine-readable instructions stored thereon for
selecting the associated one of the port and aggregation of ports for transmitting the received data frame to the destination data switch if the destination address is matched with the aggregation of ports.

15. The article of claim 13, wherein the storage medium further comprises machine-readable instructions stored thereon for selecting a one port in the aggregation of ports for transmission of the received data frame based upon one of the destination address and a source address of the received data frame.

* * * * *

UNITED STATES PATENT AND TRADEMARK OFFICE
CERTIFICATE OF CORRECTION

PATENT NO. : 6,868,071 B1
DATED : March 15, 2005
INVENTOR(S) : Jensen et al.

It is certified that error appears in the above-identified patent and that said Letters Patent is hereby corrected as shown below:

Column 3,
Line 28, delete "destifation" and insert -- destination --.

Column 10,
Line 59, after "data", insert -- frame --.
Line 60, after "protocol" delete "frame".

Column 12,
Line 56, delete "subseguent" and insert -- subsequent --.

Signed and Sealed this

Twelfth Day of July, 2005

JON W. DUDAS
*Director of the United States Patent and Trademark Office*